United States Patent
Sahara et al.

[11] Patent Number: 6,101,665
[45] Date of Patent: Aug. 15, 2000

[54] WIPER BLADE

[75] Inventors: Hideshi Sahara, Toyohashi; Masaaki Moroto, Ama-gun, both of Japan

[73] Assignee: ASMO Co., Ltd, Japan

[21] Appl. No.: 09/172,725

[22] Filed: Oct. 13, 1998

[30] Foreign Application Priority Data

Oct. 16, 1997 [JP] Japan .................................. 9-283532
Oct. 16, 1997 [JP] Japan .................................. 9-283979

[51] Int. Cl.$^7$ ................................................... B60S 1/38
[52] U.S. Cl. ................................... 15/250.46; 15/250.44
[58] Field of Search .......................... 15/250.46, 250.44, 15/250.361, 250.43, 250.47, 250.201, 250.32, 250.48

[56] References Cited

U.S. PATENT DOCUMENTS 5,331,712  7/1994  Chang ................................... 15/250.44

FOREIGN PATENT DOCUMENTS

| 2638010 | 3/1978 | Germany | 15/250.44 |
|---|---|---|---|
| Y2-61-29560 | 9/1986 | Japan . | |
| 4-129862 | 4/1992 | Japan . | |
| 1090415 | 11/1967 | United Kingdom | 15/250.47 |
| 1117095 | 6/1968 | United Kingdom | 15/250.46 |

*Primary Examiner*—Gary K. Graham
*Attorney, Agent, or Firm*—Fish & Richardson P.C.

[57] ABSTRACT

A wiper blade of a wiper device is composed of a primary lever driven by an wiper arm to swing on a windshield, a pair of bowed secondary levers connected to the primary lever to extend on a side of the primary lever facing a direction of the swinging and a pair of bowed yoke levers connected to the primary lever to extend on the side of the primary lever opposite to the secondary levers and a rubber blade supported by the yoke levers. Thus, the primary lever, the secondary levers and the yoke levers are disposed in the same plane above the windshield, thereby reducing the frontal projected area relative to air flow. Each of the secondary levers is connected jointly with one of the yoke levers to rotate on a shaft fixed to the primary lever.

16 Claims, 8 Drawing Sheets

FIG. 16

WIPER BLADE

CROSS REFERENCE TO RELATED APPLICATION

The present application is based on and claims priority from Japanese Patent Applications Hei 9-283532 filed on Oct. 16, 1997 and Hei 9-283979 filed on Oct. 16, 1997, the contents of which are incorporated herein by reference.

BACKGROUND OF THE INVENTION

1. Field of the Invention

The present invention relates to a wiper blade of a wiper device for a vehicle.

2. Description of the Related Art

It is common to use for a wiper device for wiping a curved windshield of a vehicle a so-called tournament-graph type wiper blade that is composed of a rubber blade, a plurality of levers for supporting the rubber blade. The plurality of levers include a primary lever which is rotatably connected to an arm piece of the wiper arm, a pair of secondary levers which are respectively supported by the primary lever at the opposite ends thereof and two pair of yoke levers which are respectively supported by the secondary levers at the opposite ends thereof, thereby supporting the rubber blade at equal intervals. The above-described levers are rotatably connected to one another in the direction perpendicular to the windshield or in the height of the rubber blade. Therefore, the wiper blade has many rotatable joints so that the rubber blade can bend to come into contact with the curved surface of the windshield.

However, the conventional tournament-graph type wiper blade needs many joints, many parts and manufacturing steps. Moreover, the levers stacked in the height of the rubber blade increase the frontal projected area of the wiper blade relative to the air flowing along the windshield when a vehicle runs. Accordingly, the air resistance and the lift of the wiper blade increase as the vehicle speed increases. A large amount of the air resistance necessitates increase of the mechanical strength of the wiper, which increases the size thereof. A large amount of the lift decreases the pressure of the rubber blade on the windshield, lowering the wiper performance.

JP-A-4-129862 proposes a wiper blade which has levers extending on the sides of the rubber blade, thereby preventing increase in the frontal projected area of the wiper blade even if the curvature of the windshield increases. However, this wiper blade has also the above-described tournament-graph type structure and still needs many parts and manufacturing steps in order to apply this wiper blade to an acutely-curved windshield.

If such a tournament-graph type wiper blade is covered with snow or ice, the levers may be stuck with the snow or ice sticking between the levers. Accordingly the wiper blade can not sufficiently bend to come into contact with the windshield.

SUMMARY OF THE INVENTION

The present invention has an object of providing an inexpensive wiper blade which need not many parts and manufacturing steps and prevents increase in the air resistance and lift thereof.

According to a main aspect of the present invention, a wiper blade of a wiper device for a windshield is composed of a first lever rotatably connected to a wiper arm for swinging on the windshield, a second lever extending on a side of the first lever facing a direction of swinging of said first lever, a third lever extending on a side of the first lever facing a direction of swinging of the first lever and a rubber blade supported by the second and third levers, and the second lever and third lever are connected to the first lever to be rotatable on an axis.

Therefore, the number of joint portions and parts thereof can be reduced by comparison with the conventional wiper blade. Further, the levers are disposed in a plane parallel with the windshield so that the frontal projected area relative to air flow flowing along the windshield can be reduced. Thus, the wiping performance of the wiper blade for a curved windshield can be increased.

According to another aspect of the invention, a wiper blade of a wiper device for a curved windshield is composed of a flexible rubber blade, a primary lever rotatably connected to the wiper arm for swinging the rubber blade with a pressure on the windshield, a pair of bowed secondary levers extending on a side of the primary lever facing a direction of swinging, and a plurality of bowed yoke levers extending on the side of the primary lever opposite to the secondary levers. Each of the secondary levers is rotatably connected to opposite ends of said primary lever, and each of the yoke levers is rotatably connected to one of opposite ends of the secondary levers to support the rubber blade so as to move along the curved windshield.

Therefore, the levers are disposed in a plane parallel with the windshield so that the frontal projected area relative to air flow flowing on the windshield can be reduced. Thus, the wiping performance of the wiper blade for a curved windshield can be increased. Further, the number of yokes can be increased to use the longer rubber blade easily.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS (First Embodiment)

A wiper blade according to a first embodiment of the present invention is described with reference to FIGS. 1–4.

Figure 1:
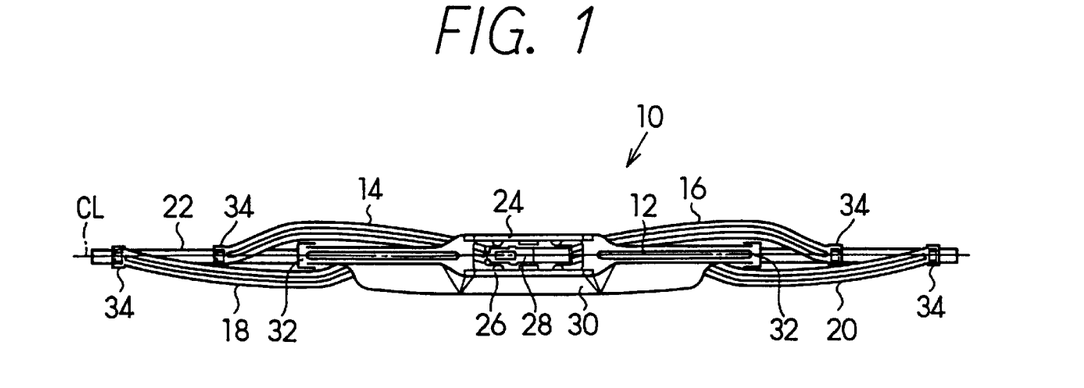
FIG. 1 is a plan view of a wiper blade according to a first embodiment of the present invention.
Figure 2:
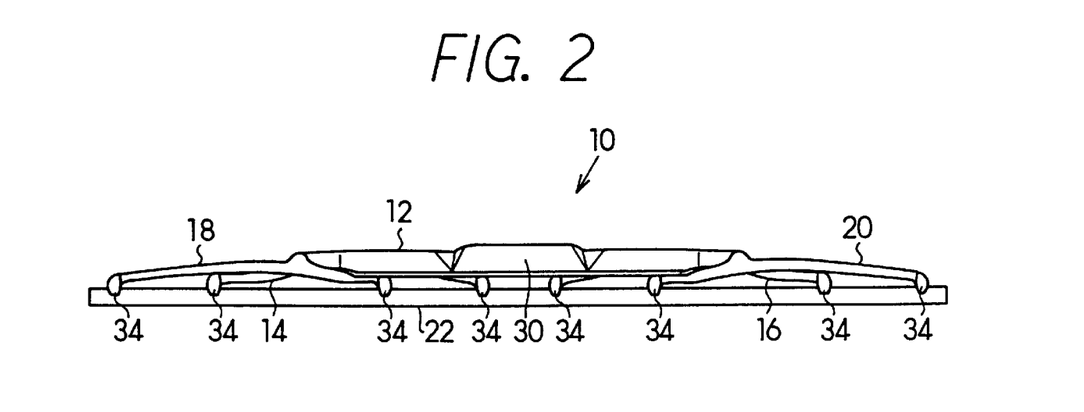
FIG. 2 is a front view of the wiper blade shown in FIG. 1.

Wiper blade 10 is composed of primary lever 12, a pair of secondary levers 14, 16, a pair of yoke levers 18, 20 and a rubber blade 22 to be disposed in contact with a windshield of a vehicle.

Primary lever 12 has a pair of foot plate 24, 26 formed on the opposite sides at the middle thereof. Holder 28 is fixed to primary lever 12 between the pair of foot plates 24, 26 to be rotatable. Holder 28 is positioned right above longitudinal center line CL of rubber blade 22 as shown in FIG. 1. Holder 28 receives the tip of an arm piece or retainer of a wiper arm (not shown) in a well-known manner so that primary lever 12 can rotate relative to the arm piece. Primary lever 12 has a wing member 30 or a so-called air dam at the side thereof facing the wiper closing direction or on the upstream side of the primary lever in the air flow. Primary lever 12 has also a pair of joint portions 32 at the opposite sides thereof. Secondary lever 14 and yoke lever 18 are connected at one of the joint portions 32, and secondary lever 16 and yoke lever 20 are connected at the other joint portion 32.

Figure 3:
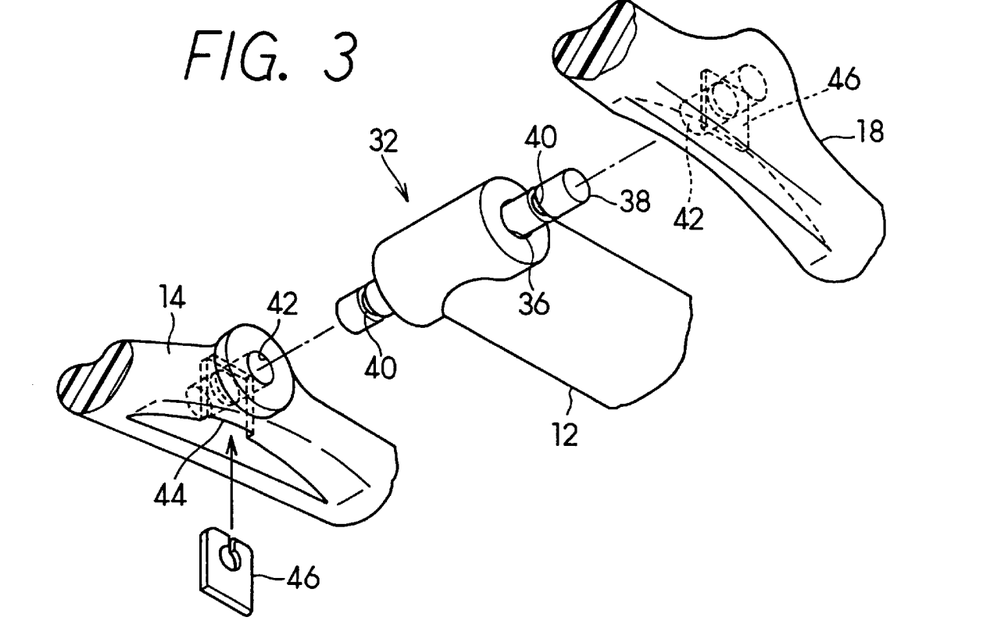
FIG. 3 is a fragmentary perspective exploded view of a joint portion of the wiper blade according to the first embodiment.
Figure 4:
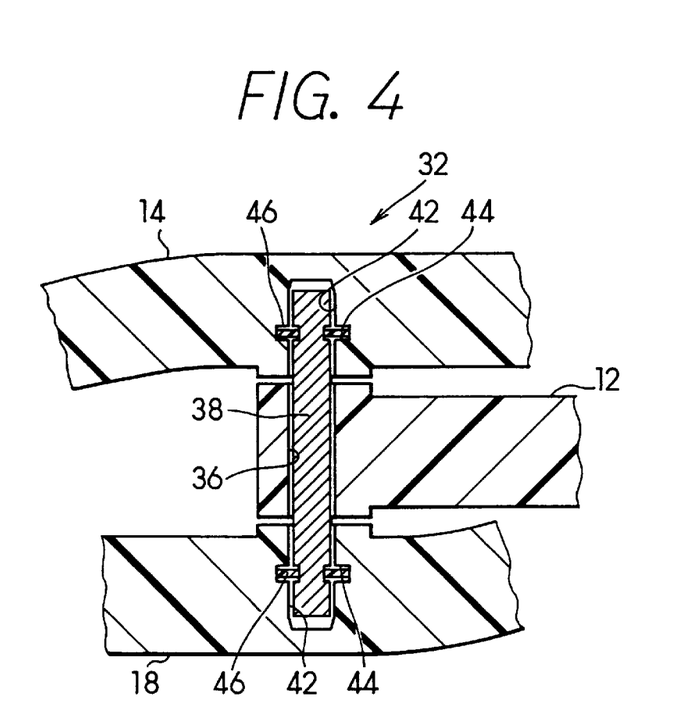
FIG. 4 is a fragmentary cross-sectional view of a joint portion of the wiper blade according to the first embodiment.

Secondary levers 14, 16 are made of resinous material and disposed on the wiper opening side or the downstream side of primary lever 12. Yoke levers 18, 20 are made of resinous material and disposed on the wiper closing side of the primary lever or the upstream side thereof in the air flow. As shown in FIGS. 3 and 4, secondary lever 14 and yoke lever 18 are rotatably secured to one of joint portions 32 of primary lever 12 jointly, and secondary lever 16 and yoke lever 20 are rotatably secured to the other joint portion 32 in the same manner. Accordingly, primary lever 12, secondary levers 14, 16, and yoke leavers 18, 20 are disposed in the same plane parallel with the windshield, and, therefore, the height of the wiper 15 blade from the windshield surface can be reduced. Thus, the frontal projected area relative to the air flowing around the wiper blade can be reduced.

Each of joint portions 32 has a through hole 36 formed at the tip of primary lever 12 and shaft 38 inserted in through hole 36 to extend to opposite ends. Shaft 38 is made of metal and has annular grooves 40 formed at the opposite ends thereof. Secondary lever 14 and yoke lever 18 have bottomed holes 42 for receiving shaft 38 and slits 44 at portions corresponding to annular groove 40. Slits 44 opens at the surfaces (back surfaces) of secondary lever 14 and yoke lever 18 facing the windshield. Stoppers 46, such as E-rings or C-rings, are respectively inserted into slits 44 and annular grooves 40 of shaft 38 to hold shaft 38 in hole 42. Thus, secondary lever 14 and yoke lever 18 are rotatably connected at joint portions 32 of primary lever 12 by one of shafts 38. In the same manner, secondary lever 16 and yoke lever 20 are rotatably connected at the other joint portion 32 of primary lever 12 by the other of shafts 38. Accordingly, the number of joint parts (or shafts) and the joint steps of all the levers can be reduced from those for the above-stated tournament-graph type wiper blade.

Stoppers 46 can be substituted by wire clips.

Each of secondary levers 14, 16 and yoke levers 18, 20 has a pair of U-shaped finger member 34 at opposite ends thereof to grasp or support rubber blade 22. Each of secondary levers 14, 16 bows at joint portion 32 to center line CL or in the wiper closing direction. On the other hand, each of yoke levers 18, 20 bows at joint portion 32 to center line CL or in the wiper opening direction. Thus, secondary levers 14, 16 and yoke levers 18, 20 support rubber blade 22 in a straight line.

When wiper blade 10 is pressed on a curved windshield, all levers rotate about the joint portions 32 so that rubber blade 22 can bend to come into contact with the curved surface of the windshield, thereby assuring complete wiping.

If some or all of the levers are covered by snow or ice, the snow or ice does not stick to shaft 38, which is inserted in holes 36, 42, and the snow or ice between the levers can be removed when secondary lever 14 or 16 and yoke lever 18 or 20 rotate about the corresponding one of joint portions 32.

When wiper blade 10 is going to turn, rubber blade 22 can also turn smoothly because holder 28 of primary lever 12 is disposed above the longitudinal center of rubber blade 22 to eliminate the couple of forces. Rubber blade 22 does not become wavy but maintains straight because of bow-shaped secondary levers 14, 16 and bow-shaped yoke levers 18, 20.

If wiper blade 10 operates while the vehicle runs at a high speed, wing member (air dam) 30 generates pressing force and interrupts air flowing to the lip of rubber blade 22, thereby preventing rubber blade 22 from lifting.

(Variants of First Embodiment)

Figure 5:
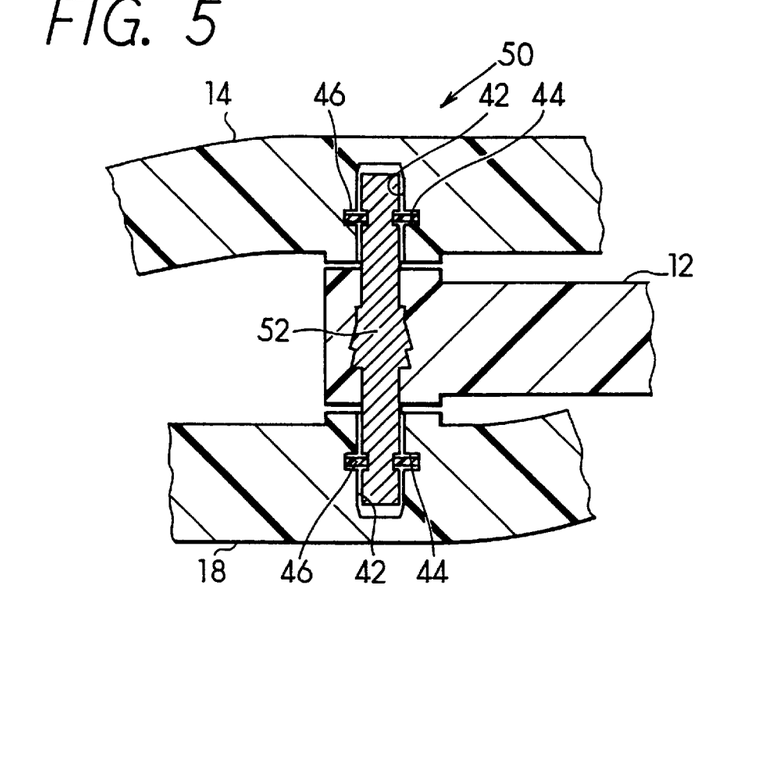
FIG. 5 is a fragmentary cross-sectional view of a joint portion of a variant of the wiper blade according to the first embodiment.

Joint portion 50 having serrated metal shaft 52 press-fitted into the end portion of primary lever 12 can be substituted by joint portion 32 having shaft 38 as shown in FIG. 5. The operation and effects of joint portion 50 are substantially the same as joint portion 32.

Figure 6:
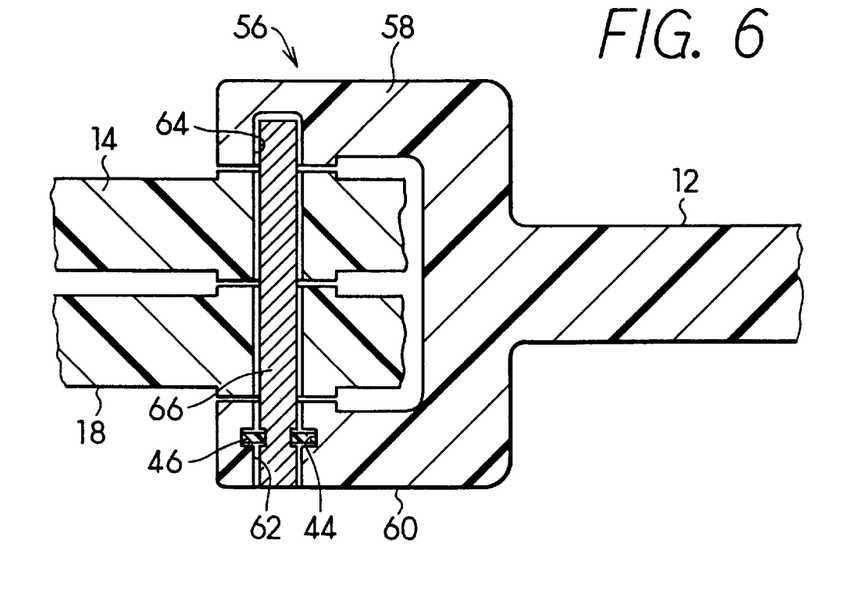
FIG. 6 is a fragmentary cross-sectional view of a joint portion of a variant of the wiper blade according to the first embodiment.

Joint portion 56 can be also substituted for joint portion 32 as shown in FIG. 6. Joint portion 56 is composed of a U-shaped member having a pair of fingers 58 and 60 formed at the end of primary lever 12 and shaft 66 inserted in through hole 62 of finger 60 and bottomed hole 64 of finger 58 so that secondary lever 14 and yoke lever 18 can rotate about shaft 66. Slit 44, stopper 46 are substantially the same as those of joint portion 32 according to the first embodiment. The operation and effects of joint portion 56 are substantially the same as joint portion 32.

Figure 7:
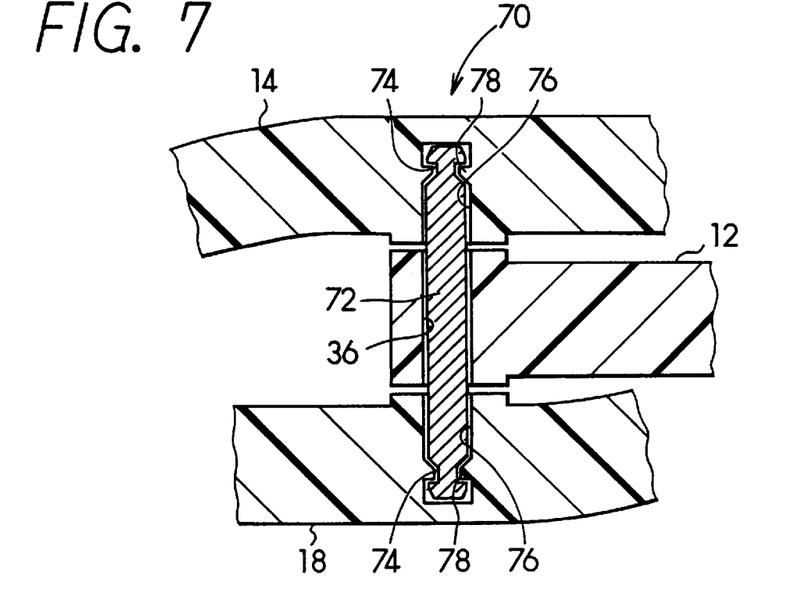
FIG. 7 is a fragmentary cross-sectional view of a joint portion of a variant of the wiper blade according to the first embodiment.

Joint portion 70 can be also substituted for joint portion 32 as shown in FIG. 7. Shaft 72 of joint portion 70 has annular grooves 74 at the opposite ends thereof, and secondary lever 14 and yoke lever 18 have bottomed holes 76 and ring portions 78 fitted around annular grooves 74 respectively so that secondary lever 14 and yoke lever 18 can rotate relative to joint portion 70 of primary lever 12. The operation and effects of joint portion 70 are substantially the same as joint portion 32.

Figure 8:
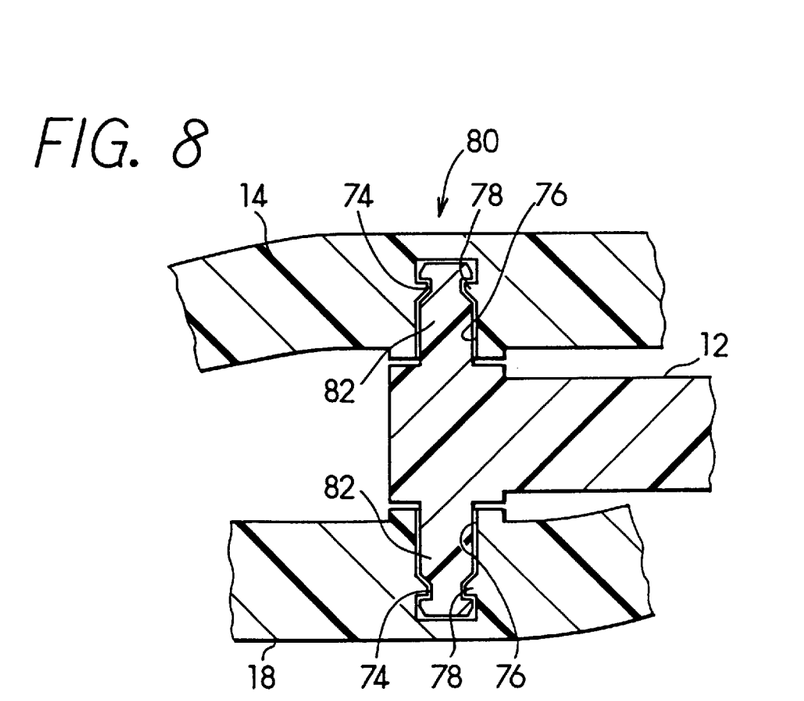
FIG. 8 is a fragmentary cross-sectional view of a joint portion of a variant of the wiper blade according to the first embodiment.

Joint portion 80 can be also substituted for joint portion 32 as shown in FIG. 8. Shaft 82 of joint portion 80 is formed integral with primary lever 12. Other portions are the same as joint portion 70. The operation and effects of joint portion 80 are substantially the same as joint portion 70.

Figure 9:
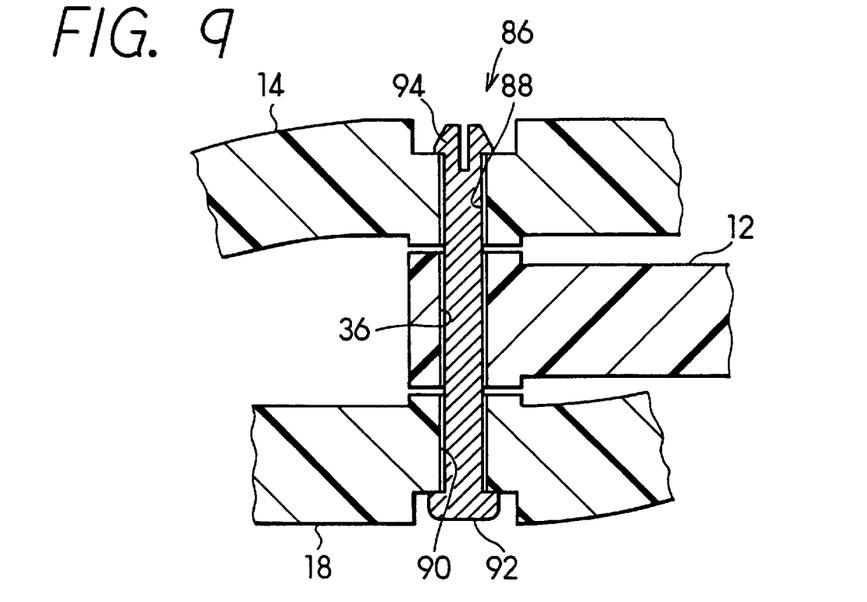
FIG. 9 is a fragmentary cross-sectional view of a joint portion a variant of the wiper blade according to the first embodiment.

Joint portion 86 can be also substituted for joint portion 32 as shown in FIG. 9. Secondary lever 14 has through hole 88, and yoke lever 18 has through hole 90. Shaft 92 extends in through hole 90 of yoke lever 18, through hole 36 of primary lever 12 and through hole 88 of secondary lever 14. Shaft 92 has a snap-fit portion 94 at an end thereof. The operation and effects of joint portion 70 are substantially the same as joint portion 32.

Figure 10:
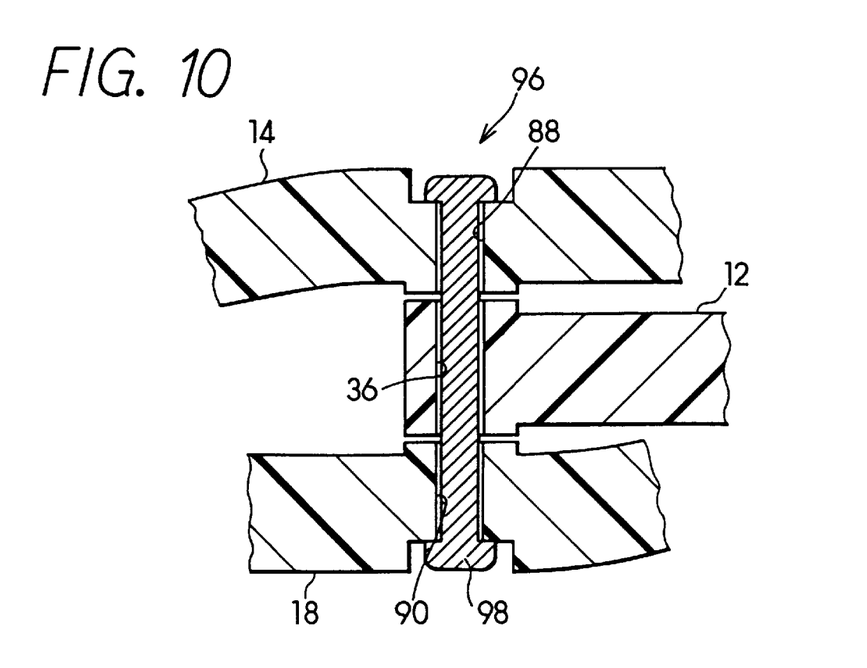
FIG. 10 is a fragmentary cross-sectional view of a joint portion of a variant of the wiper blade according to the first embodiment.

Joint portion 96 can be substituted for joint portion 86 as shown in FIG. 10. Yoke lever 18, primary lever 12 and secondary lever 14 are rivetted by shaft 98 inserted in through hole 90 of yoke lever 18, through hole 36 of primary lever 12 and through hole 88 of secondary lever 14. The operation and effects of joint portion 70 are substantially the same as joint portion 32.

Figure 11:
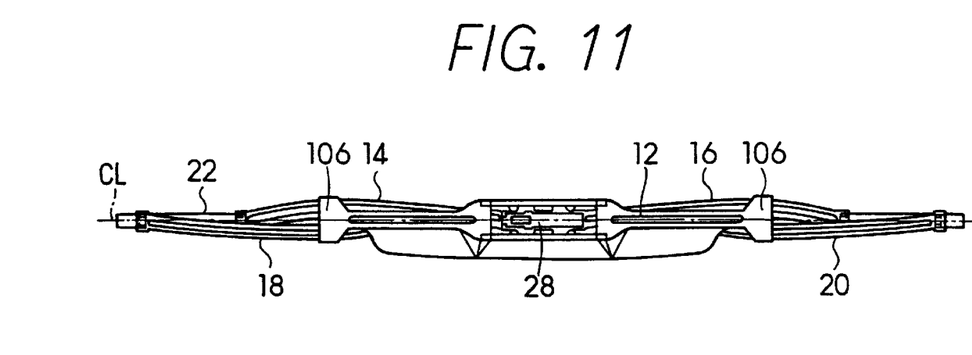
FIG. 11 is a plan view of a variant of the wiper blade according to the first embodiment of the present invention.

Joint portions 106 can be substituted for joint portion 32 as shown in FIG. 11. Each of joint portions 106 is composed of U-shaped finger member grasping from outside one of secondary levers 14, 16 and one of yoke levers 18, 20. The operation and effects of joint portion 70 are substantially the same as joint portion 32.

(Second Embodiment)

Figure 12:
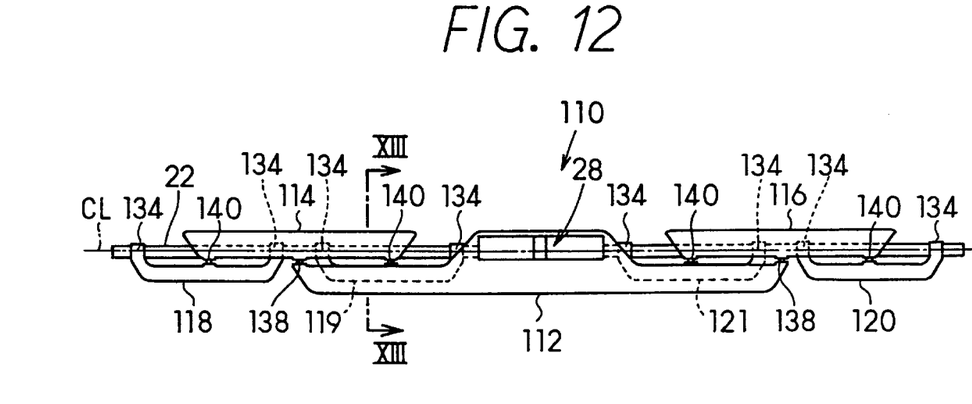
FIG. 12 is a plan view of a wiper blade according to a second embodiment of the present invention.
Figure 13:
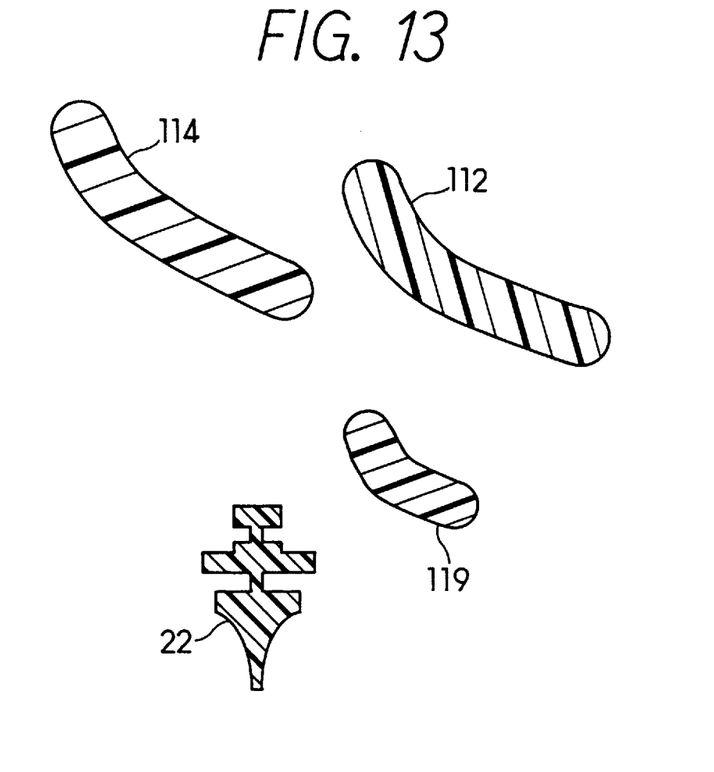
FIG. 13 is a schematic cross-sectional view showing relationship between levers and a rubber blade of the wiper blade according to the second embodiment.

Wiper blade 110 according to a second embodiment of the present invention is described with reference to FIGS. 12 and 13.

Wiper blade 110 is composed of primary lever 112, a pair of secondary levers 114, 116, four yoke levers 118, 119, 120, 121, and rubber blade 22. As shown in FIG. 13, primary lever 112, secondary levers 114, 116 and yoke levers 118, 119, 120, 121 have wing-shaped cross sections to provide pressing force and reduces air flowing to the lip of rubber blade 22, thereby preventing rubber blade 22 from lifting. Primary lever 112 has holder 28 disposed right above the longitudinal center of rubber blade 22 and pins 138 at opposite ends thereof. Secondary lever 114 is rotatably connected primary lever 112 by one of pins 138 at the middle thereof, and secondary lever 116 is rotatably connected to the same by the other pin 138 at the middle thereof. Secondary levers 114, 116 are disposed on the wiper opening side of primary lever 112 or the downstream side thereof in the air flow flowing along the windshield. Each of secondary levers 114, 116 overlap respectively with each end of primary lever 112 at the ends thereof.

Each of secondary levers 114, 116 has a pair of pins 140 at the opposite ends thereof to rotatably connect to yoke levers 118, 119 or yoke levers 120, 121. Yoke levers 118, 119, 120, 121 are disposed on the wiper closing side of primary lever 112 or the upstream side thereof in the air flow on the windshield. Yoke levers 118, 120 overlap respectively with the outer end of secondary levers 114, 116 at the inner end thereof. Each of yoke levers 118, 119, 120, 121 has a pair of U-shaped finger members 134 grasping rubber blade 22. Each of yoke levers 118, 119, 120, 121 bows toward secondary levers 114, 116 or longitudinal center line CL to place rubber blade 22 in a straight line.

The operation and effects of the above wiper blade are almost the same as the wiper blade according to the first embodiment.

The above described wiper blade has eight finger members 134 for supporting rubber blade 22. However, more finger members 134 can be provided if the number of yoke levers is increased. In this case, each of a pair of second yoke levers is disposed next to one of the pair of yoke levers (first yoke levers) 118, 120 on the side of primary lever 112 opposite the first yoke levers. A pair of third yoke lever is also disposed next to the pair of yoke levers on the side of primary lever 112 opposite the second yoke lever. Thus a plurality of yoke levers (a pair of n-th yoke levers) can be added. The connection of the yoke levers is the same as the connection of yoke lever 118 and yoke lever 118 by secondary lever 114.

(Third Embodiment)

Figure 14:
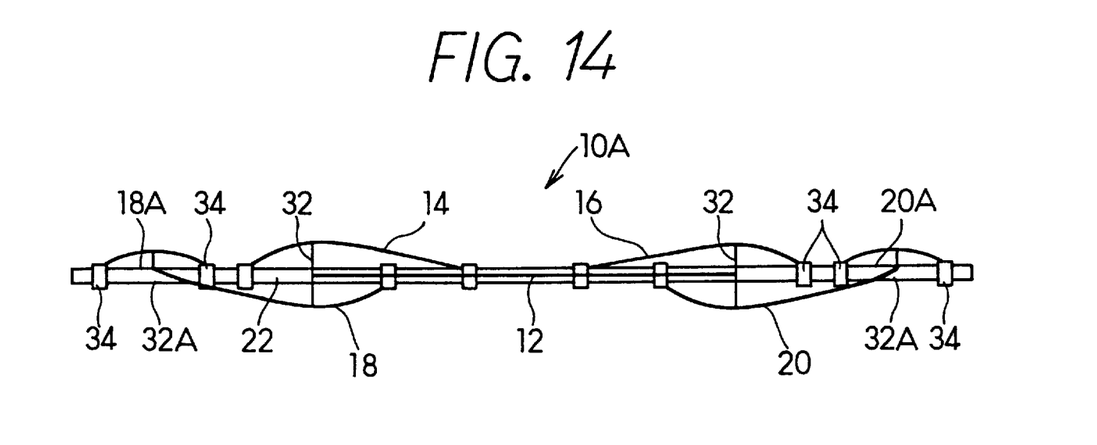
FIG. 14 is a plan view of a wiper blade according to a third embodiment of the present invention.

A wiper blade 10A according to a third embodiment of the present invention is briefly described with reference to FIG. 14.

Wiper blade 10A has a pair of second yoke levers 18A, 20A rotatably connected to yoke levers 18, 20 shown in FIG. 1 respectively at joint portions 32A. The above structure is effective to provide a wider wiping area. Other portions are almost the same as those of wiper blade 10 according to the first embodiment, and the operation and other effects are almost the same as wiper blade 10.

(Fourth Embodiment)

Figure 15:
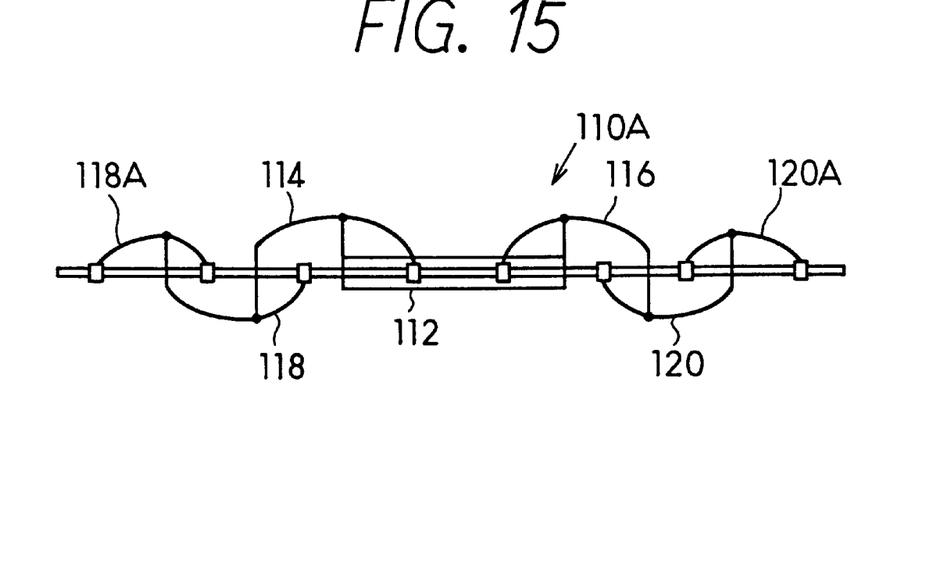
FIG. 15 is a plan view of a wiper blade according to a fourth embodiment of the present invention.

A wiper blade 110A according to a fourth embodiment of the present invention is briefly described with reference to FIG. 15.

Wiper blade 110A has second yoke levers 118A, 120A rotatably connected to yoke levers 118, 120 respectively. The above structure provides additional wiping area. Other portions are almost the same as those of wiper blade 110 according to the second embodiment, and the operation and other effects are almost the same as wiper blade 110.

(Fifth Embodiment)

Figure 16:
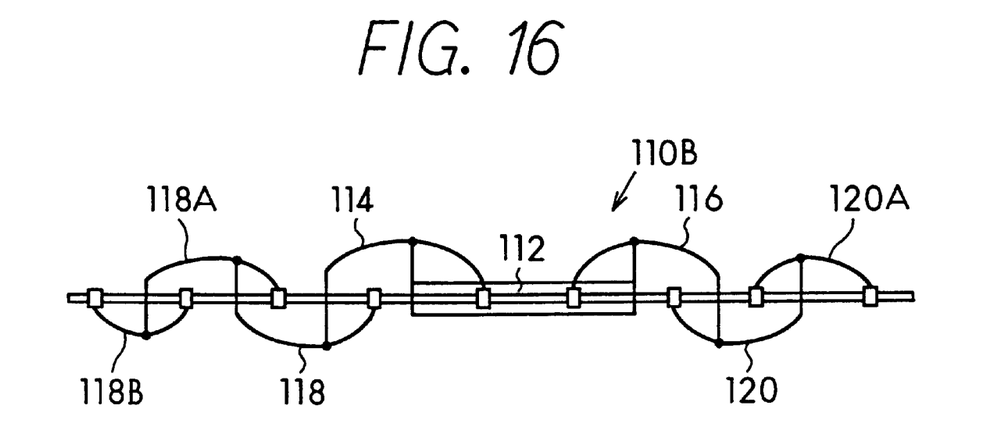
FIG. 16 is a plan view of a wiper blade according to a fifth embodiment of the present invention.

A wiper blade 110B according to a fifth embodiment of the present invention is briefly described with reference to FIG. 16.

Wiper blade 110B has third yoke lever 118B rotatably connected to second yoke lever 118A. The above structure provides additional wiping area. Other portions are almost the same as those of wiper blade 110A according to the fourth embodiment, and the operation and other effects are almost the same as wiper blade 110 A.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A wiper blade of a wiper device for a vehicle windshield including a wiper motor and a wiper arm driven by said wiper motor, said wiper blade comprising:

a first lever, rotatably connected to said wiper arm, for swinging on said windshield alternately in a first direction and a second direction opposite said first direction;

a second lever extending on a first side of said first lever facing the first direction of swinging of said first lever, said second lever rotatably connected to an end of said first lever on an axis;

a third lever extending on a second side of said first lever facing the second direction of swinging of said first lever, said third lever rotatably connected to the end of said first lever on said axis; and a rubber blade supported by said second and third levers.

2. The wiper blade as claimed in claim 1 further comprising a fourth lever disposed between said second lever and said rubber blade for supporting said rubber blade at an end thereof.

3. The wiper blade as claimed in claim 1, wherein each of said first, second, third levers is made of resinous material.

4. The wiper blade as claimed in claim 3, wherein said first, second and third levers are rotatably connected by a shaft jointly.

5. The wiper blade as claimed in claim 4, wherein said shaft has engagement portions at opposite ends thereof in engagement with corresponding portions of said first, second and third levers.

6. The wiper blade as claimed in claim 5, wherein said shaft is made of metal and covered by said first, second and third levers.

7. The wiper blade as claimed in claim 1, wherein said second and third levers are bowed toward a longitudinal center of said rubber blade to support said rubber blade in a straight line.

8. The wiper blade as claimed in claim 7, wherein said first lever has a member connected to said wiper arm disposed above the longitudinal center of said rubber blade.

9. A wiper blade of a wiper device for a curved windshield including a wiper motor and a wiper arm driven by said wiper motor, said wiper blade comprising:

a flexible rubber blade;

a primary lever rotatably connected to said wiper arm for swinging said rubber blade with a pressure on said windshield, said primary lever swinging alternately in a first direction and a second direction opposite said first direction;

a pair of bowed secondary levers extending on a side of said primary lever facing said first direction of swinging, each of said secondary levers rotatably connected to longitudinally opposite ends of said primary lever; and a plurality of bowed yoke levers extending on the side of said primary lever opposite to said secondary levers, each of said yoke levers rotatably connected to one of said secondary levers for supporting said rubber blade so as to move along said curved windshield.

10. The wiper blade as claimed in claim 9 further comprising a second yoke lever extending on the same side of said primary lever as said secondary levers extend, said second yoke lever rotatably connected to one of said yoke levers at an outer end thereof to support an outer end of said rubber blade.

11. The wiper blade as claimed in claim 10 further comprising a third yoke lever extending on the same side of said primary lever as said yoke levers extend, said third yoke lever rotatably connected to an outer end of said second levers to support an outer end of said rubber blade.

12. The wiper blade as claimed in claim 9, wherein each of said primary lever, secondary levers and yoke levers are made of resinous material.

13. The wiper blade as claimed in claim 9, wherein each end of said yoke levers is disposed on the longitudinal center line of said rubber blade.

14. The wiper blade as claimed in claim 9, wherein at least one of said primary lever, secondary levers and yoke levers has a wing member for preventing said rubber blade from lifting.

15. The wiper blade as claimed in claim 14, said wing member is an integral portion of said one of said primary lever, secondary levers and yoke levers.

16. The wiper blade as claimed in claim 15, said primary lever overlaps with said secondary levers at ends thereof, and said secondary levers respectively overlap with said yoke levers at ends thereof.

* * * * *

UNITED STATES PATENT AND TRADEMARK OFFICE
CERTIFICATE OF CORRECTION

PATENT NO. : 6,101,665
DATED : August 15, 2000
INVENTOR(S) : Hideshi Sahara and Masaaki Moroto It is certified that error appears in the above-identified patent and that said Letters Patent is hereby corrected as shown below:

<u>Title page,</u>
Item [73], Assignee, after "ASMO Co., Ltd. Japan",
please add -- Tokai Riki Mfg. Co., Ltd. --.

Signed and Sealed this

Twenty-seventh Day of January, 2004

JON W. DUDAS
*Acting Director of the United States Patent and Trademark Office*